United States Patent [19]

Gandiglio

[11] Patent Number: 5,067,366
[45] Date of Patent: Nov. 26, 1991

[54] SERVO-ASSISTED DEVICE FOR OPERATING A VEHICLE PARKING BRAKE

[75] Inventor: Romolo Gandiglio, Villanova D'Asti, Italy

[73] Assignee: Fiat Auto S.p.A., Turin, Italy

[21] Appl. No.: 545,715

[22] Filed: Jun. 29, 1990

[30] Foreign Application Priority Data

Jul. 28, 1989 [IT] Italy ................................ 67646 A/89

[51] Int. Cl.$^5$ .................. G05G 5/06; F16D 65/14; F16D 19/00
[52] U.S. Cl. .......................... 74/535; 74/538; 74/625; 188/106 P; 188/156; 192/83
[58] Field of Search .............. 74/535, 578, 625, 501.6; 188/106 P, 156; 192/83

[56] References Cited

U.S. PATENT DOCUMENTS

| | | | |
|---|---|---|---|
| 3,620,099 | 11/1971 | Stotz | 74/538 X |
| 3,638,766 | 2/1972 | Besoyan | 188/106 P |
| 4,138,905 | 2/1979 | Konishi | 74/535 X |
| 4,629,043 | 12/1986 | Matsuo et al. | 192/4 A |
| 4,795,002 | 1/1989 | Burgei et al. | 188/156 X |
| 4,795,003 | 1/1989 | Colgate | 192/83 X |
| 4,819,501 | 4/1989 | Kraus et al. | 74/535 X |
| 4,854,187 | 8/1989 | Walters | 74/535 |
| 5,001,942 | 3/1991 | Boyer | 74/538 X |

FOREIGN PATENT DOCUMENTS

| | | |
|---|---|---|
| 2815018 | 10/1979 | Fed. Rep. of Germany . |
| 3210402 | 9/1983 | Fed. Rep. of Germany . |
| 3238196 | 4/1984 | Fed. Rep. of Germany . |
| 3704018 | 8/1988 | Fed. Rep. of Germany . |

Primary Examiner—Allan D. Herrmann
Assistant Examiner—David W. Laub
Attorney, Agent, or Firm—Shlesinger, Arkwright & Garvey

[57] ABSTRACT

A servo-assisted device for operating a parking brake of a moto vehicle is described, consisting of a control lever for a brake cable or rod, mounted rotatably on a pivot, a ratchet mechanism adapted to permit rotation of the lever in a predetermined direction and a push button for disengaging the ratchet mechanism; the principal characteristic of the invention consists in the fact that the brake cable or rod is connected to the control lever through an actuator pivoted beneath the control lever and to a movable element of which the said brake cable is fixed.

18 Claims, 4 Drawing Sheets

SERVO-ASSISTED DEVICE FOR OPERATING A VEHICLE PARKING BRAKE

BACKGROUND OF THE INVENTION

The present invention relates to a servo-assisted device for operating a vehicle parking brake, adapted to permit the engagement/disengagement of the parking brake without requiring any physical force on the part of the user.

It is known that the device for operating the parking brake of a vehicle currently consists of a lever pivoted to a bracket fixed to the floor of the vehicle and connected to a brake cable the tensioning of which controls the clamping of the rear brake shoes; in order to maintain the operating lever in the desired position it is connected to a ratchet mechanism which can be disengaged by means of a push button carried by the hand brake lever itself; to engage the parking brake the user must grip and pull the control lever upwardly by hand in such a way as to put the brake cable under tension and, overcoming the resistance offered by the brake shoes, consequently clamp these latter against the brake drum; once positioned the brake lever holds the brake cable under tension (and therefore maintains the parking brake engaged) in that the ratchet mechanism stops it from returning to the rest position flush with the vehicle floor; by disengaging the ratchet mechanism the lever is released and can be returned to the rest position releasing the parking brake. The described operations require that the user exert on the lever a distinct physical force, in particular upon disengaging the ratchet mechanism in that, in order to be able to actuate the release push button it is necessary to pull the lever further.

SUMMARY OF THE INVENTION

The object of the invention is that of providing a servo-assisted device for operating the parking brake of a vehicle, which can be operated by the user without any physical force, in particular by means of the pressure of a simple push button or switch, maintaining, however, the possibility of operating the parking brake manually, for example in the case of breakdown of the servo control.

The said object is achieved by the invention, which relates to a servo-assisted device for operating a parking brake of a vehicle, comprising a control lever for a brake cable or rod, mounted rotatably on a pivot, a ratchet mechanism adapted to permit the rotation of the lever in a predetermined direction, and ratchet mechanism disengagement means, characterised by the fact that it further includes an actuator adapted to cause tensioning of the said brake cable or rod, the said brake cable or rod being mechanically connected to the control lever through the said actuator.

BRIEF DESCRIPTION OF THE DRAWINGS

For a better understanding of the invention there is now given a non-limitative description of an embodiment, with reference to the attached drawings, in which.

DETAILED DESCRIPTION OF THE INVENTION

Figure 1:
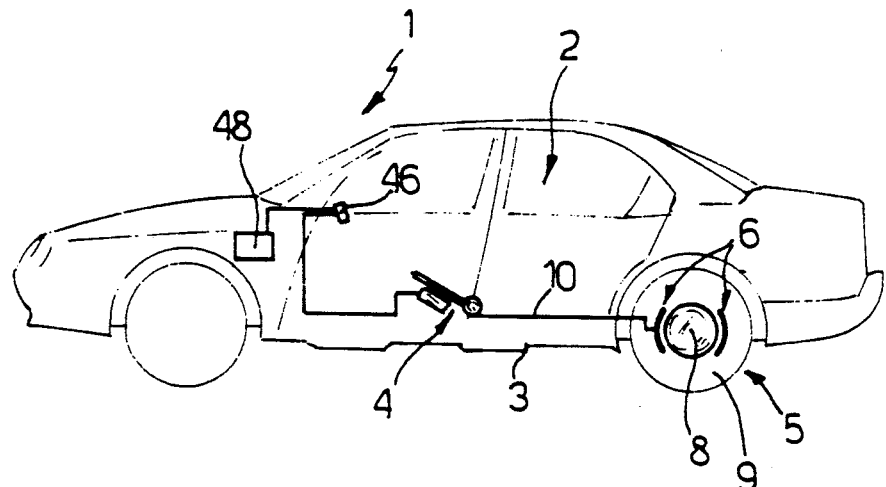
FIG. 1 schematically illustrates a vehicle provided with a parking brake operating device formed according to the invention.

With reference to the said Figures, the reference numeral 1 indicates a known vehicle, in this case a motor vehicle, a passenger compartment 2 of which, delimited at the bottom by a floor 3, houses a servo-assisted device 4 for operating a parking brake 5 of the vehicle 1 which, according to a known configuration makes use of the rear brakes of the vehicle 1 and comprises respective brake shoes 6 (or brake pads in the case of disc brakes) adapted to cooperate frictionally with a drum (disc) 8 of each rear wheel 9 of the vehicle 1 upon tensioning of a known brake cable or pull rod 10 connected in a known way not illustrated for simplicity to the brake shoes 6, tensioning of which is effected, as will be described, by means of the control device 4.

Figure 3:
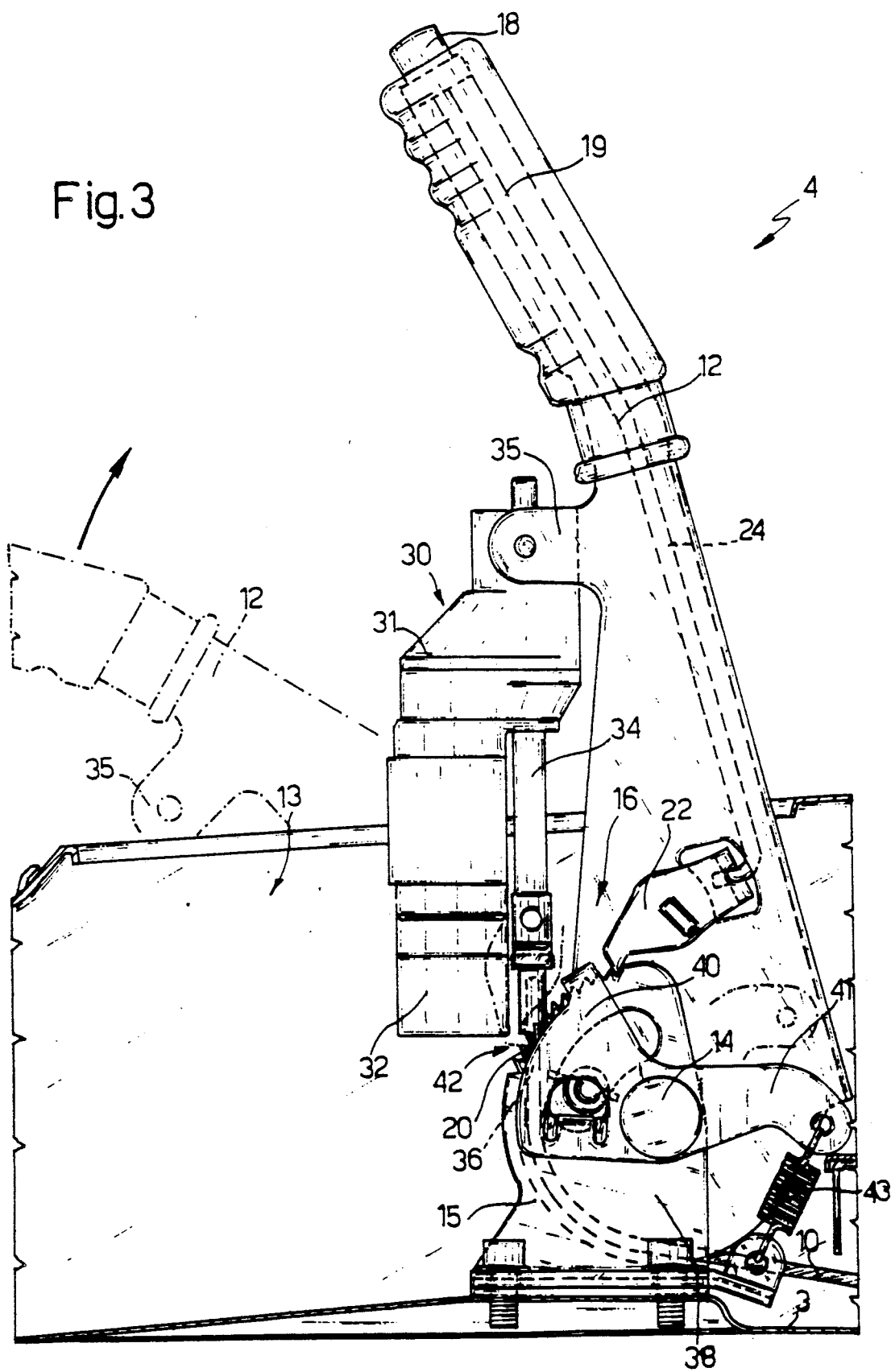

The device 4 includes an operating lever 12 adapted to actuate the brake cable 10 and disposed adjacent the floor within a seat 13 formed through the floor 3; the lever 12 is pivoted to the floor 3 in that it is rotatably mounted on a pivot 14 in turn supported by a bracket 15 fixedly secured to the floor 3 within the seat 13; the brake operating device 4 further includes a ratchet mechanism 16 adapted to permit the rotation of the lever 12 in only one predetermined direction, indicated by the arrow in FIG. 3, such as to move it away from the floor 3, and ratchet mechanism disengagement means 16 defined by a push button 18 projecting axially from a handle 19 of the lever 12. In particular, the ratchet mechanism 16 comprises a saw toothed sector 20 formed fixedly with the support bracket 15 of the pivot 14 coaxially with this latter, and a pawl 22 rockably carried and projecting laterally from the lever 12, preferably against the action of resilient means of known type not illustrated for simplicity, snap-engaging with the toothed sector 20 in a manner such as to slide over the teeth of this latter when the pawl 22 is displaced, together with the lever 12, in the said predetermined direction and to engage against the tooth with which it is at that moment in contact when the lever 12 is stressed to turn in the opposite direction, in this example towards the floor 3, in such a way as to prevent this rotation as long as the pawl 22 has not been disengaged from the toothed sector 20; this disengagement is effected in a known way by pressing the push button 18 which is connected in a known way to the pawl 22 by means, for example, of a push rod 24 housed longitudinally within the interior of the lever 12, which push rod causes, following pressure on the push button 18, rotation of the pawl 22 in the direction of the arrow (FIG. 4) with consequent disengagement thereof from the toothed sector 20.

According to the invention the device 4 further includes an electromechanical actuator 30 connected to the brake cable 10 and acting to cause tensioning of this latter without any necessity of manual intervention on the part of the user whilst leaving available the possibility of causing tensioning of the cable 10 in the traditional manner, by means of the upward rotation of the lever 12; according to the principal characteristic of the invention, in fact, the brake cable 10 is mechanically connected to the control lever 12 through the actuator 30 itself, which is mechanically disposed in series with the kinematic chain constituted by the lever 12 and the cable 10. In particular the actuator 30 comprises a body 31 housing the mechanism and which is pivotally suspended to the control lever 12 beneath this, an electric motor 32 projecting axially from the body 31 parallel to the lever 12, and a movable element 34 supported by the body 31 and fixedly secured to the end 36 of the cable 10 opposite the brake shoes 6; in this example the body 31 is rockably pivoted to an ear 35 formed integrally on the underside of the lever 12, and the movable element 34 is defined by a cylindrical stem which slides rearwardly actuated by the motor 32 parallel to the motor 32 itself, in such a way as to tension or release the cable 10 respectively when the element 34 is displaced in the direction of the arrow (FIG. 4) or in the opposite direction.

Figure 4:
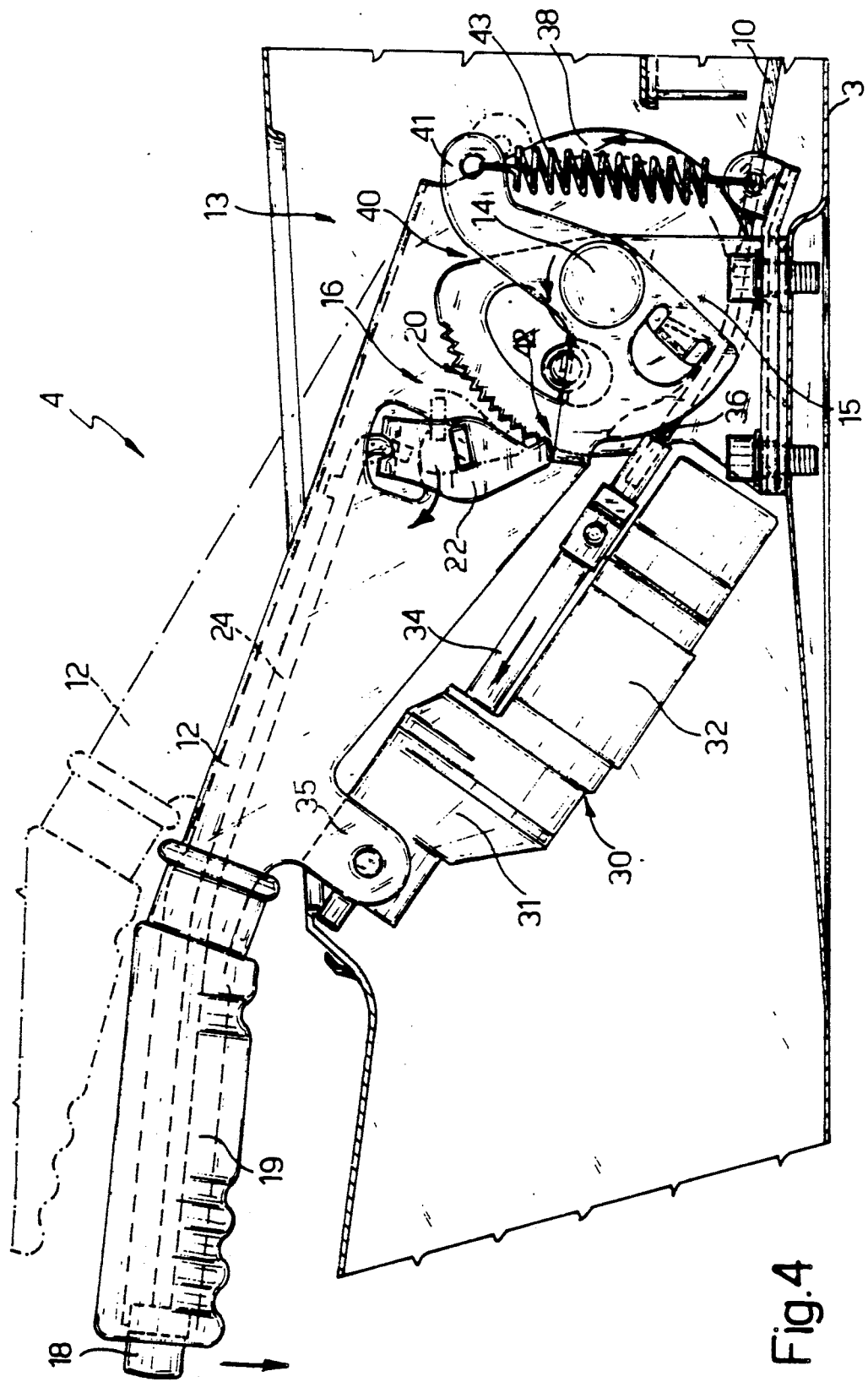

Within the lever 12 coaxially with the pivot 14 is arranged a pulley or drum 38 over which the brake cable 10 is partially wound, biased so as to favour its movement by the actuator 30; according to a further characteristic of the invention, fixed to the toothed sector 20 there is arranged an end stop element 40 adapted to determine the rest position of the lever 12 with the pawl 22 immediately before this latter reaches, during descending movement of the lever 12 towards the floor 3, a terminal section 42 of the toothed sector 20; in particular the end stop element 40 is movable to permit the release of the brake in the case of a loss of current or breakage of the motor 32. The element 40 is in fact defined by a bracket freely mounted coaxially with the pin 14 and which, therefore, is fixed to the toothed sector 20 only in the sense that it is carried by an element (the pin 14) in turn supported by the same element (the bracket 15), which also carries the toothed sector 20. The end stop element or bracket 40 is moreover biased, by means of a radial arm 41, by associated resilient means defined by a coil spring 43 acting normally to maintain the end stop element 40 between the pawl 22 and the end section 42 of the toothed sector 20, as well as to oppose with its resilient reaction the rotation of the bracket 40 on the pin 14 in the direction the arrow (FIG. 4). The pawl 22 is further shaped and positioned in such a way as to be able, following rotation of the lever 12 towards the toothed terminal section 42, to displace the end stop element 40, making it turn in the direction indicated in FIG. 4 against the action of the said resilient means 43 in such a way as to render accessible the section 42 of the toothed sector 20; in this way the pawl 22 is able to reach and, subsequently, engage (upon release of the push button 18) the terminal section 42 itself.

The actuator 30 is controlled by an actuation switch 46 (FIG. 1) disposed within the passenger compartment 2 of the vehicle 1 in a position easily accessible to the user when driving the vehicle itself, for example on the dashboard; this switch 46, for example of the push button type, directs current to the motor 32, which is of reversible type, in such a way as to make it turn in the desired direction; preferably, furthermore, the actuator 30 is also controlled by a central electronic control unit 48, for example of the known microprocessor type, wired in such a way as to give priority to the control of the actuator 30 when the vehicle 1 is in operation and programmed in such a way as to be adapted to cause the parking brake 5 of a vehicle 1 to operate, causing the operation of the actuator 30 in a suitable direction upon reversal of the vehicle 1 if it takes place in predetermined conditions, for example if the reverse gear is not engaged.

Figure 5A:
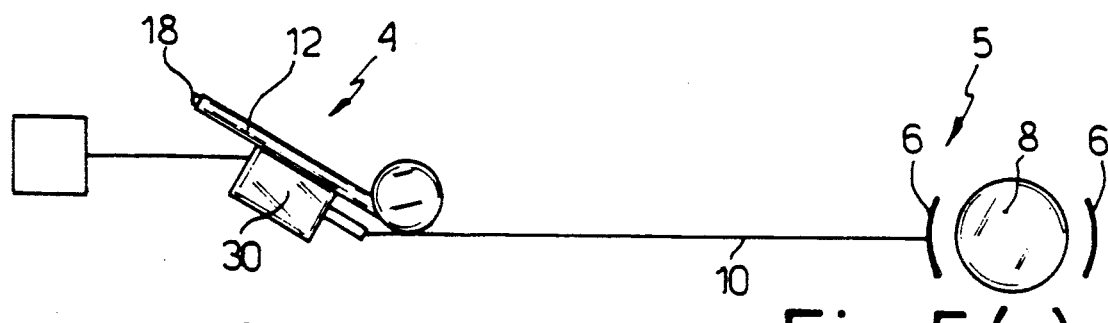
FIG. 5 schematically illustrates the operation of the device of FIGS. 2, 3 and 4.
Figure 5B:
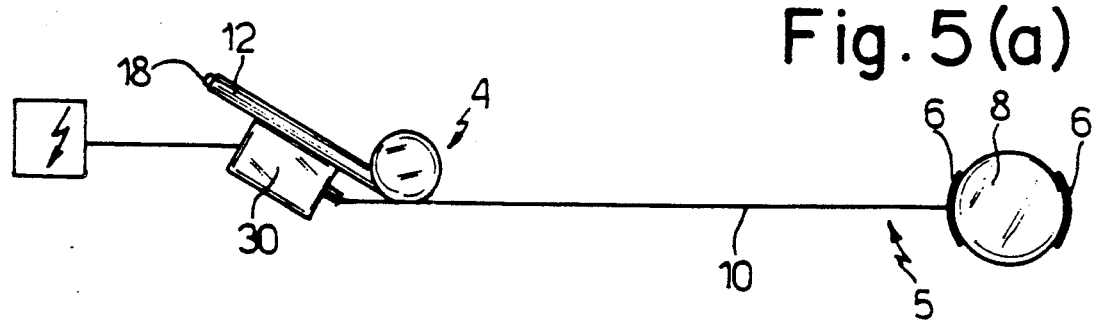
Figure 2:
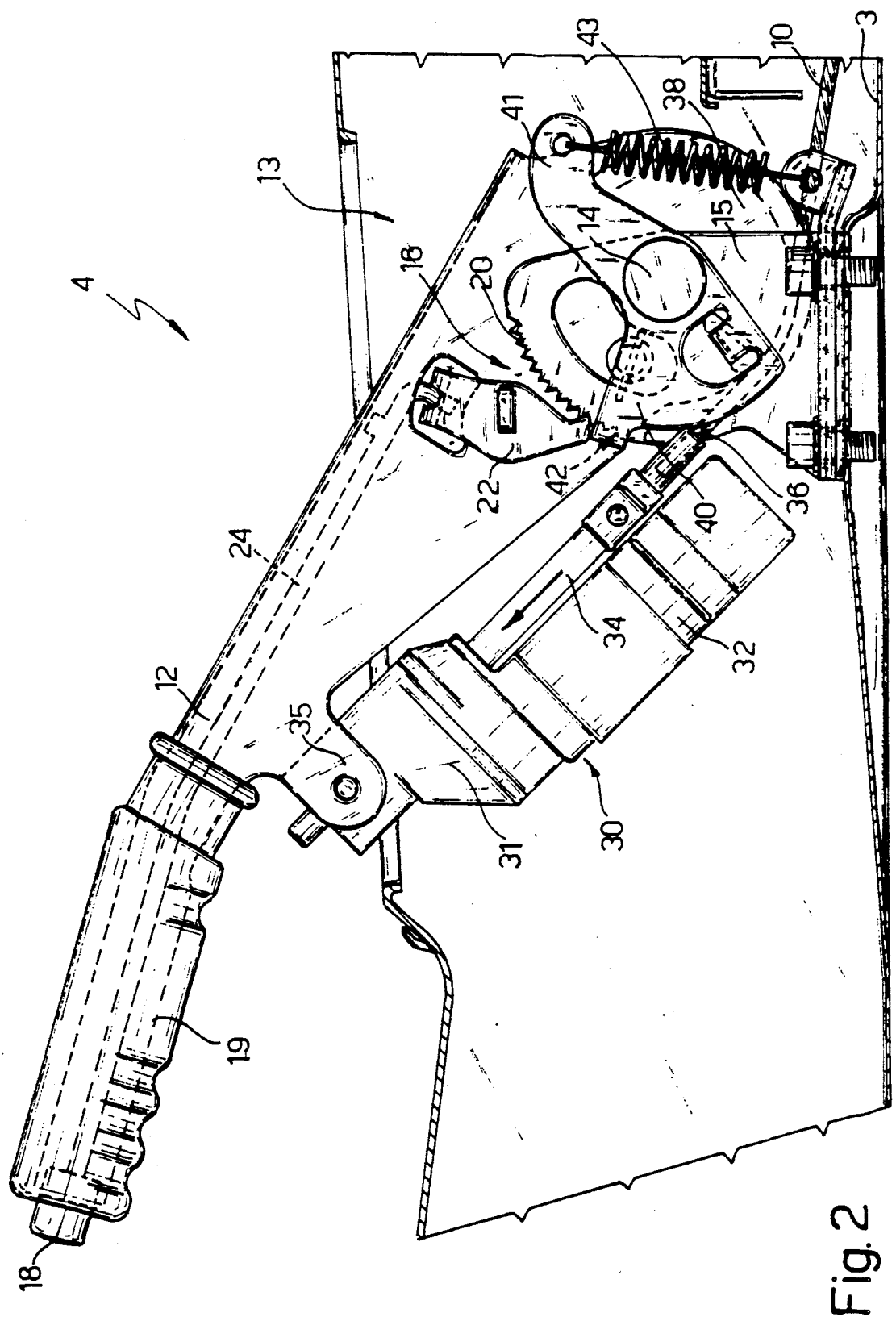
FIGS. 2, 3 and 4 illustrate respective side views of the control device according to the invention in different operating positions.

The operation of the device described is shown in FIG. 5; when the lever 12 is in the position illustrated in FIG. 2, which is the rest position, and the push button 46 is not actuated, the parking brake 5 is in the configuration indicated in FIG. 5(a); the movable element 34 is at the end of its stroke towards the drum 38 and the cable or pull rod 10 is not tensioned; consequently the brake shoes 6, under the effect of their own biasing means (known and not illustrated for simplicity) are spaced from the drum 8 and the vehicle 1 is not braked; if the user wishes to actuate the parking brake 5 and, therefore, presses the push button 46, or if a predetermined condition for the intervention of the central control unit 48 occurs, the actuator 30 is energised and the configuration of FIG. 5(b) obtains: the motor 32 displaces the rod 34 in the direction of the arrow towards the ear 35 causing tensioning of the brake cable 10 which passes over the drum 38 actuating the brake shoes 6 of each wheel 9 bringing them into contact with their associated brake drums with consequent braking of the vehicle 1, all without it being necessary to move the lever 12 and, therefore, without the user having to exert any physical force to disengage the parking brake 5 it will be necessary to press the push button 46 again (or else the central control unit 48 will again intervene upon the termination of the conditions which have caused the preceding intervention) to energise the actuator 30 in such a way as to cause the motor 32 to rotate in a direction opposite the preceding direction; in this way the rod 34 is made to translate towards the drum 38 and the brake cable 10 is consequently released permitting the brake shoes 6 to become spaced from the respective brake drum 8 so that the configuration in FIG. 5(a) is regained.

Figure 5C:
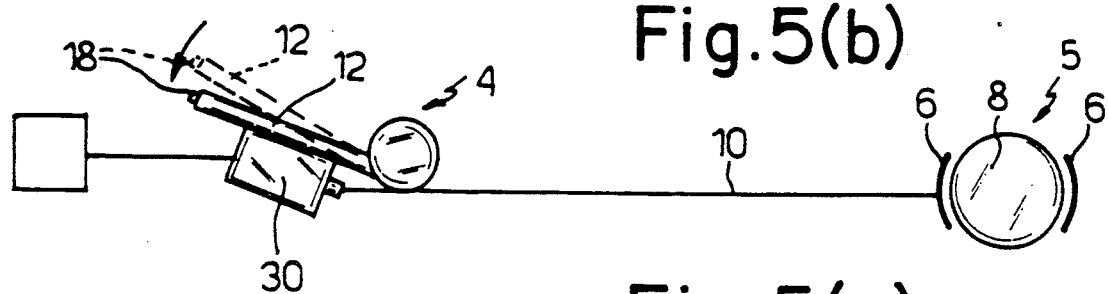

If the actuator 30 should break down with the parking brake engaged, or rather when configuration in FIG. 5(b) obtains, it is possible, according to the invention, manually to disengage the brake 5 when it is necessary to cause the vehicle 1 to move; for this purpose it will be necessary (FIG. 4) to cause the lever 12 to rotate manually in the direction of the arrow, first having pressed the push button 18 in such a way as to disengage the pawl 22 from the toothed sector 20; the lever 12 will now pass from the rest position (indicated in broken outline) to the position illustrated in FIG. 4 in that the end stop element 40 which cooperates with the pawl 22 is pressed by this latter to rotate against the action of the spring 43 in the direction of the arrow; this rotation of the lever 12 causes a slackening of the brake cable and, upon release of the push button 18, the locking of the lever 12 in the position now assumed, in that the pawl 22 is carried into correspondence with the section 42 which it engages as soon as the push button 18 is released; in this condition the configuration indicated in FIG. 5(c) obtains in that the lever 12 is displaced beneath the rest position, the brake cable 10 is partially slackened and the brake shoes 16 are spaced from the respective brake drum 8 by a distance sufficient to allow the vehicle 1 to move.

If the actuator 30 becomes unserviceable when the parking brake is not operated, or in any case in which the user prefers manually to operate it, it is possible to operate in a conventional manner as if the actuator 30 were not present; in fact (FIG. 3) it will be sufficient to pull the lever 12 in such a way as to cause it to rotate in the direction of the arrow to make it pass from the rest position to that illustrated; during this movement the pawl 22 slides over the teeth of the sector 20 successively engaging them and the brake cable 10 is tensioned in that the raising of the lever 12 also causes the raising of the actuator 30 suspended from it and to which the cable 10 is anchored; upon reaching the desired position the pawl 22, engaging against the sector 20, prevents the reverse rotation of the lever 12 until it is released with the push button 18; during the return stroke, or rather with the pawl 22 disengaged, the rest position is identified to the user by the fact that the pawl 22 strikes against the end stop element 42, which is only movable against the action of the spring 43, that is only by exercising on it a force greater than the resilient reaction exerted by the spring 43 itself; therefore, when the rest position of the lever 12 is reached it stops (the cable 10 in the meantime being completely slackened) and, upon tending to continue the movement the user will notice a resistance to rotation which just indicates that the end of stroke position has been reached. If this is inadvertently exceeded, as the user ceases to press on the lever 12 the resilient reaction on the spring 43 will automatically return the lever 12 into the rest position, which is the equilibrium position.

From what has been described the advantages connected with the invention are evident; thanks to the particular assembly of the actuator 30 the normal parking brake operating lever 12 is still operative but, however, the parking brake can also be engaged simply by acting on an electrical switch; the possible subjection to an electronic central control unit further permits automatic engagement of the parking brake in particular conditions, for example if the vehicle 1 has to stop and, then, start off again and, likewise automatically, to exclude it when it is no longer necessary. Finally the device 4 is perfectly operable if the actuator 30 should break down.

I claim:

1. A servo-system device for operating a vehicle parking brake, comprising:
   a) a support bracket including a pivot;
   b) a control lever rotatably secured to said pivot and operably associated with one end of a tension wire of a vehicle parking brake for actuating the tension wire;
   c) a ratchet mechanism adapted to permit rotation of said control lever in a predetermined direction;
   d) means for disengaging the ratchet mechanism;
   e) an actuator adapted to cause the tension wire to be tensioned independently of said control lever;
   f) said actuator being disposed between said control lever and the one end of the tension wire such that said control lever, said actuator and the tension wire form a chain in which said actuator is disposed mechanically in series, thereby permitting said control lever to actuate the tension wire independently of said actuator;
   g) said actuator comprising an outer body pivotally connected to and disposed underneath said control lever; and,
   h) said actuator including a movable element carried by said outer body and connected to the one end of the tension wire for actuating the tension wire when said movable element is displaced.

2. A device according to claim 1, wherein:
   a) said actuator is an electromechanical actuator; and,
   b) an actuating switch disposed within a passenger compartment of the vehicle for actuating said actuator.

3. A device as in claim 2, and further comprising:
   a) an electronic central control unit adapted to cause actuation of said electromechanical actuator in a predetermined manner such as to actuate the parking brake.

4. A device as in claim 1, wherein:
   a) said control lever includes a pulley secured to said pivot; and,
   b) said puley engages the tension wire.

5. A device as in claim 1, wherein:
   a) said ratchet mechanism includes a saw-toothed sector fixedly secured to said support bracket;
   b) a pawl cooperating with said saw-toothed sector and carried by said control lever;
   c) a push button carried by said control lever and connected to said pawl for disengaging said pawl upon application of pressure on said push button;
   d) said saw-toothed sector including a terminal portion; and
   e) an end stop element operably associated with said saw-toothed sector and adapted to come into contact with said pawl immediately before said pawl engages said terminal portion of said saw-toothed sector.

6. A device as in claim 5, wherein:
   a) said end stop element is pivotally secured to said pivot;
   b) a resilient biasing means adapted normally to maintain said end stop element between said pawl and said terminal portion of said saw-toothed sector; and,
   c) said pawl being adapted, upon rotation of said control lever towards said terminal portion of said saw-toothed sector, to displace said end stop element against the action of said resilient biasing means for engaging said terminal portion.

7. A device for operating a vehicle parking brake, comprising:
   a) a support bracket including a pivot;
   b) a control lever rotatably secured to said pivot and operably associated with one end of a tension wire of a vehicle parking brake for manually actuating the tension wire;
   c) said control lever having a rest position wherein the tension wire is substantially relaxed and the parking brake is disengaged, an actuated position above said rest position wherein the tension wire is under tension and the parking brake is engaged, and a disengaged position below said rest position wherein the tension wire is substantially relaxed and the parking brake is disengaged;
   d) means for manually selectively positioning said control lever in one of said rest, actuated and disengaged positions;
   e) drive means for actuating the tension wire independently of said control lever and while said control lever is in said rest position; and
   f) said positioning means including means for permitting said control lever to pivot past said rest position for manually relieving the tension wire after said drive means has actuated the tension wire, thereby permitting manual release of the parking brake if said drive means breaks down.

8. A device as in claim 7, wherein:
   a) said drive means is disposed in series and between said control lever and the one end of the tension wire such that the tension wire can be activated independently by one of said control lever and said drive means.

9. A device as in claim 7, wherein:
a) said drive means is pivotally secured to said control lever.

10. A device as in claim 7, wherein:
a) said drive means is disposed below said control lever; and
b) said drive means includes a slidable element connected to the one end of the tension wire thereby to actuate the tension wire when the slidable element is displaced.

11. A device as in claim 7, wherein:
a) said positioning means includes a ratchet mechanism; and
b) said ratchet mechanism includes means for stopping said control lever at said rest position.

12. A device as in claim 11, wherein:
a) said ratchet mechanism includes a saw-toothed sector fixedly secured to said support bracket;
b) a movable pawl cooperating with said saw-toothed sector and carried by said control lever;
c) means carried by said control lever for disengaging said pawl from said saw-toothed sector; and,
d) means for stopping said control lever at said rest position.

13. A device as in claim 12, wherein:
a) said stopping means includes a member pivotable about said control lever pivot;
b) said member includes an end portion engaging said pawl; and
c) a resilient biasing means for maintaining said end portion engaged against said pawl at said rest position.

14. A device as in claim 13, wherein:
a) said saw-toothed sector includes an end portion disposed below said member end portion; and
b) said biasing means is adapted to normally maintain said member end portion above said sector end portion.

15. A device as in claim 14, wherein:
a) said pawl, upon rotation of said control lever towards said end portion of saw-toothed sector, is adapted to displace said member end portion against the action of said resilient biasing means for reaching and engaging said saw-toothed sector end portion to relieve the tension wire after said drive means has actuated the tension wire, thereby permitting manual release of the parking brake.

16. A device as in claim 7, wherein:
a) said control lever includes a pulley secured to said support bracket pivot; and,
b) said pulley engages the tension wire.

17. A device as in claim 7, wherein:
b) said drive means includes an actuating switch disposed within a passenger compartment of the vehicle.

18. A device as in claim 7, and further comprising:
a) an electronic central control unit adapted to cause actuation of said drive means in a predetermined manner.

* * * * *